F. D. SCHILLING.
BELT FASTENER.
APPLICATION FILED JAN. 2, 1920.
1,348,747.   Patented Aug. 3, 1920.
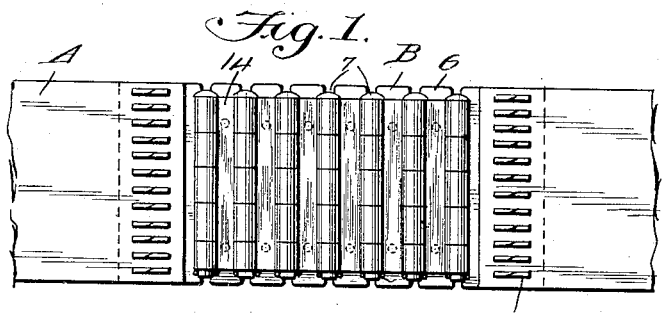
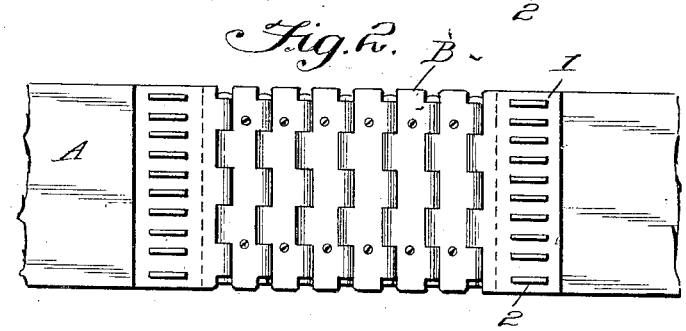
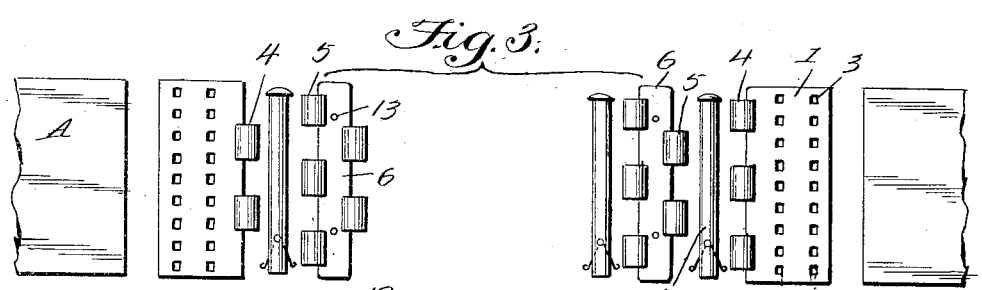
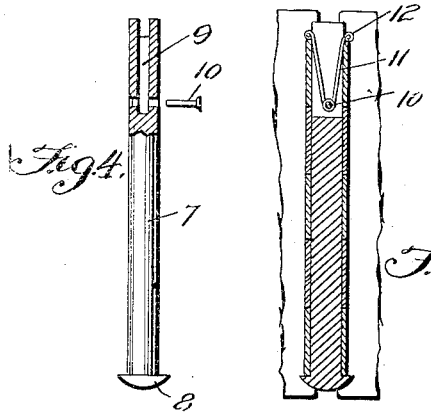
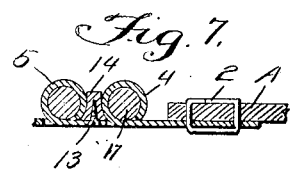
Inventor
Frank D. Schilling
By Geo. P. Kimmel
Attorney

UNITED STATES PATENT OFFICE.

FRANK D. SCHILLING, OF EMINGTON, ILLINOIS.

BELT-FASTENER.

1,348,747.  Specification of Letters Patent.  Patented Aug. 3, 1920.

Application filed January 2, 1920. Serial No. 348,862.

*To all whom it may concern:*

Be it known that I, FRANK DAVID SCHILLING, a citizen of the United States, residing at Emington, in the county of Livingston and State of Illinois, have invented certain new and useful Improvements in Belt-Fasteners, of which the following is a specification.

This invention relates to improvements in adjustable belt couplings or fasteners and has for its principal object to provide a coupling which will in no way detract from the efficiency of the belt, although it will permit of adjusting the length of the belt within certain limits to increase the effectiveness of its driving power.

Furthermore the invention has for its object to provide a suitable facing for the adjusting element and to permit of effecting adjustment of the adjusting element without the use of accessories or tools.

For the purpose of illustrating this invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangement and organization of these instrumentalities as herein shown and described.

In the drawings wherein is illustrated the preferred embodiment of the present invention.

Figure 1 is a bottom plan view of the invention.

Fig. 2 is a top plan view.

Fig. 3 is a view of the adjustable belt coupling disassembled to show clearly the construction of its various parts.

Fig. 4 is a detail view of one of the securing pins.

Fig. 5 is a sectional side view of one of the securing pins showing to advantage the spring lock therefor.

Fig. 6 is a perspective view of one of the facing blocks used in the present invention.

Fig. 7 is a sectional side view of a pair of the pins and one facing block and also showing the method of connecting the terminals of the adjustable coupling with the belt fabric.

Similar characters of reference indicate like or similar parts throughout the several views of the drawings, in which:—

A designates a belt of conventional design to the terminals of which are secured the end plates 1 of the adjustable coupling generally designated by B. The securing means for the end plates 1 consists of a plurality of clenched attaching members 2 extending through rows of openings 3 formed therein in the manner clearly shown in Figs. 1 and 3 of the drawings.

Formed on the free edges of the plates 1 are hinge loops 4 adapted to aline with hinge loops 5 on the intermediate plates 6 to receive pins 7 for securing the same together in an assembly. The intermediate plates 6 may be of any desired number and have hinge loops 5 on both edges so that they form in substance a flexible connection, any one of the links of which (one plate and one pin) may be removed quickly to decrease the length of the flexible connection to adjust the belt about pulleys or the like.

The pins 7 have heads 8 and slotted terminals 9 within which are pivoted as at 10 V-shaped springs 11 having looped ends 12 for engaging when expanded the edges of the hinge loops 4 or 5 as the case may be to hold the pins in position. In removing the pins it is merely necessary to compress the springs 11 and remove the same to adjust the connection for the purpose above stated.

Secured though the medium of screws or rivets 13 on the intermediate plates 6 between the hinge loops 5 are facing members which have concave sides for receiving the loops and form an effective continuation of the belting surface and support the hinge connection.

In forming the connection in the manner described a smooth adequate gripping surface (underside) as shown in Fig. 2 is provided and quick adjustability of the connection can be effected in an obvious manner, and without the use of accessories or tools.

As many changes could be made in the above construction and many widely different embodiments of this invention could be made without departing from the scope thereof, it is intended that all matters contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which as a matter of language, might be said to fall therebetween.

What is claimed is:

1. A belt coupling of the type described comprising end members for attachment to the terminals of a belt, plates hingedly and removably connected with the end members and with each other, and removable facing members carried on the plate members between the loops for the purpose set forth.

2. A belt coupling of the type described comprising end members for attachment to the terminals of a belt, plates having hinged loops thereon, hinge loops on the end members for alinement with the hinge loops on the plate members, pins removably carried in the hinge loops for securing the plates to the end members and to each other, resilient means for holding the pins in position in the loops, and removable substantially frusto-conically shaped facing members on the plate members between the loops for the purpose set forth.

3. A belt coupling of the type described comprising end members for attachment to the terminals of a belt, plates between the end members, hinge loops on the plates, hinge loops on the end members for alinement with the hinge loops on the plate members, pins carried in the hinge loops for securing the plates and end members together, springs carried on the pins for removably securing the pins within the loop members, and facing members carried on the plate members for the purpose set forth.

4. A belt coupling of the type described comprising end members, plates carried by the end members, hinge loops on the plates and end members, facing members on the plates between the hinge loops, pins carried in the hinge loops for securing the plates and end members together, said pins formed with terminal slots, V-shaped springs pivoted in the slots and formed with turned ends, and the turned ends of the spring members engaging the hinge loops to hold the pins removably in position.

In testimony whereof, I affix my signature hereto.

FRANK D. SCHILLING.